United States Patent
Bice, Jr.

(10) Patent No.: US 9,874,019 B1
(45) Date of Patent: Jan. 23, 2018

(54) GUTTER CLEARING DEVICE

(71) Applicant: Larry L. Bice, Jr., Bono, AR (US)

(72) Inventor: Larry L. Bice, Jr., Bono, AR (US)

( * ) Notice: Subject to any disclaimer, the term of this patent is extended or adjusted under 35 U.S.C. 154(b) by 0 days.

(21) Appl. No.: 15/412,854

(22) Filed: Jan. 23, 2017

Related U.S. Application Data

(63) Continuation-in-part of application No. 29/543,069, filed on Oct. 20, 2015, now Pat. No. Des. 777,302.

(51) Int. Cl.
| | |
|---|---|
| *E04D 13/00* | (2006.01) |
| *E04D 13/076* | (2006.01) |
| *E04D 13/064* | (2006.01) |
| *E03B 3/03* | (2006.01) |
| *E04D 13/068* | (2006.01) |

(52) U.S. Cl.
CPC ......... *E04D 13/076* (2013.01); *E04D 13/064* (2013.01); *E03B 3/03* (2013.01); *E04D 13/068* (2013.01); *E04D 13/0765* (2013.01)

(58) Field of Classification Search
CPC ..... E03B 3/03; E04D 13/076; E04D 13/0765; E04D 13/064; E04D 13/068
USPC .......... 52/16, 11, 12, 13, 32, 749.1, DIG. 1; 248/674, 678, 48.1, 48.2
See application file for complete search history.

(56) References Cited

U.S. PATENT DOCUMENTS

| | | | | |
|---|---|---|---|---|
| 4,014,074 A * | 3/1977 | Faye | ...................... | E04D 13/076 16/392 |
| 4,998,386 A * | 3/1991 | Baumgarth | ........... | E04D 13/064 52/11 |
| 5,737,879 A * | 4/1998 | Sweet | ................... | E04D 13/076 248/48.1 |
| 7,891,907 B2 * | 2/2011 | Smith | ................... | E03F 5/0401 405/36 |
| 8,646,217 B2 * | 2/2014 | Ratajac | ................. | E04D 13/076 52/11 |

* cited by examiner

*Primary Examiner* — Chi Q Nguyen
(74) *Attorney, Agent, or Firm* — Schrantz Law Firm, PLLC; Stephen D. Schrantz

(57) ABSTRACT

The gutter clearing device provides an adjustable barrier and attachment base with base aperture attachable to a base. The barrier opens to expose the base aperture and provide access into a gutter aperture of the gutter. The adjustable barrier closes to allow the water to flow across the gutter clearing device towards the downspout. A seal on the gutter clearing device between the barrier and the attachment base reduces the amount of water that leaks at the gutter clearing device. A seal located between the attachment base and gutter also reduces the amount of water that leaks at the gutter clearing device.

20 Claims, 10 Drawing Sheets

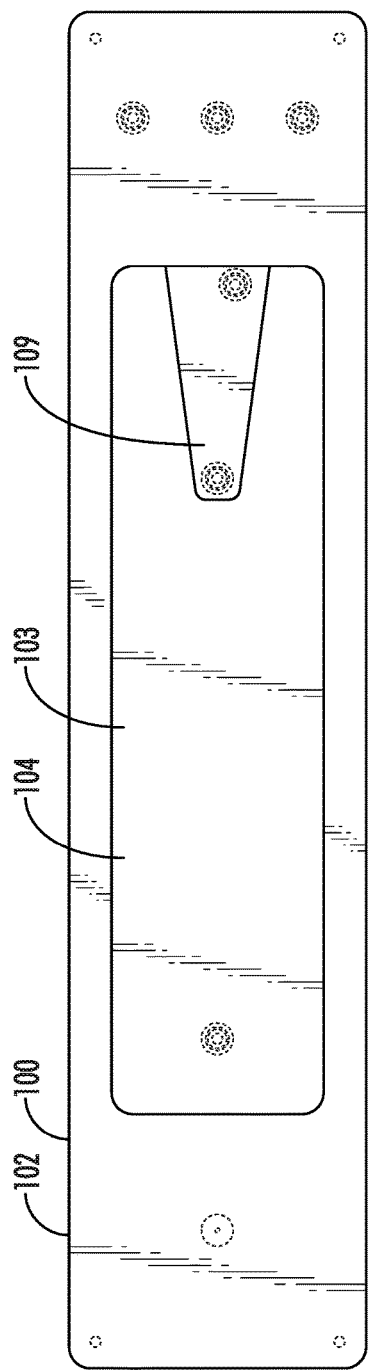
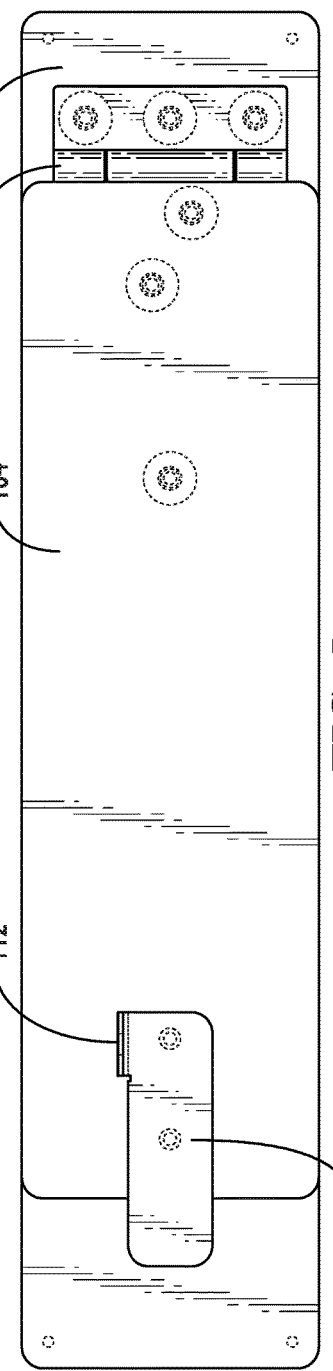
FIG. 3
FIG. 4
FIG. 5

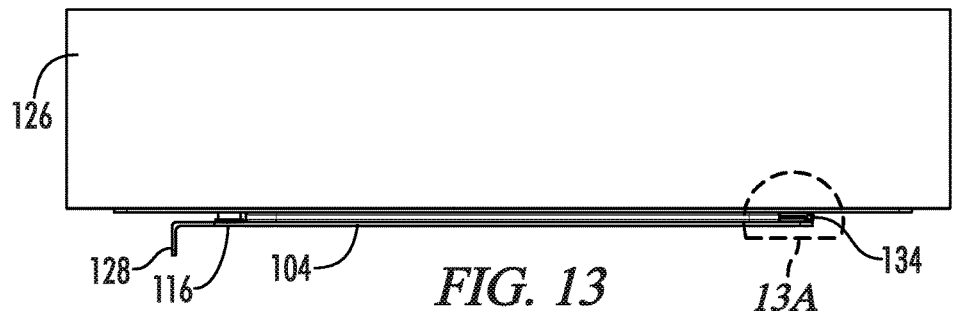
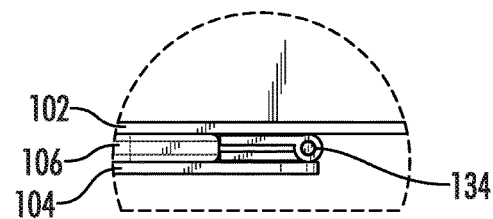
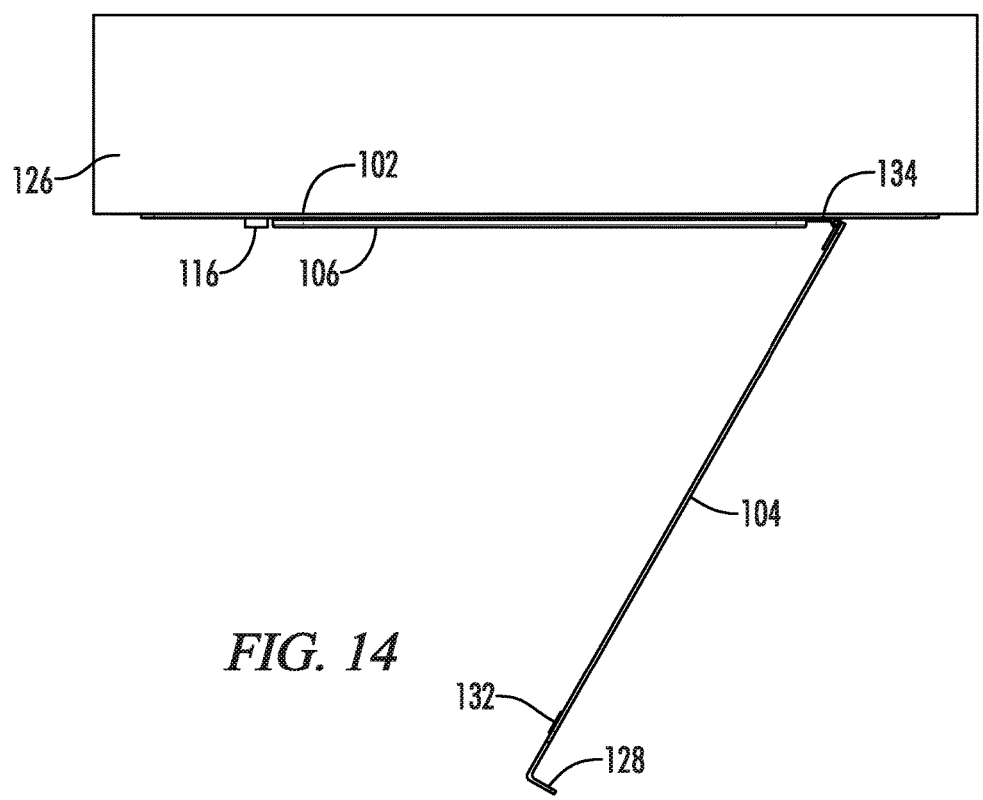

GUTTER CLEARING DEVICE

CROSS-REFERENCE TO RELATED APPLICATIONS

This application claims priority to and is a continuation in part of U.S. patent application Ser. No. 29/543,069 entitled GUTTER CLEARING DEVICE filed Oct. 20, 2015.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to devices, systems, and methods for clearing the gutter of leaves, limbs, sticks, debris, and other obstructions that may collect within the gutter.

Gutters direct rain water, melting snow/ice, and other precipitation to a desired location. Usually, these gutters direct the precipitation away from the foundation of a home. Leaves, debris, sticks, and other obstructions clog the gutters. These clogs in the gutter reduce the effectiveness and functionality of the gutters.

Thus, the present invention is needed to remove the debris, leaves, sticks, and other obstructions from the gutter. The present invention eliminates the need to climb on the roof to remove such debris. The present invention also provides a method of removing the debris that enables gravity to assist with clearing of the gutter.

II. Description of the Known Art

Patents and patent applications disclosing relevant information are disclosed below. These patents and patent applications are hereby expressly incorporated by reference in their entirety.

U.S. Pat. No. 7,891,907 issued to Smith on Feb. 22, 2011 ("the '907 patent") teaches a drainage device having an inlet having at least three substantially straight sides with rounded corners linking the at least three substantially straight sides. The sides and corners taught by the '907 patent taper to form a circular outlet. The '907 patent teaches that the rounded corners are upper edges of channels of the device, and the channels are depressions in the sides.

U.S. Pat. No. 8,646,217 issued to Ratajac on Feb. 11, 2014 ("the '217 patent") teaches a gutter insert for preventing the clogging of gutters and devices that are used for conducting a fluid to a desired location. The gutter insert taught by the '217 patent can be connected end-to-end to produce a modular gutter insert having a desired length for placement in a gutter or like device. Closed ends on each segment of the modular gutter insert taught by the '217 patent provide a plurality of internal screens for preventing debris from flowing towards downstream gutter downspouts and outlets.

SUMMARY OF THE INVENTION

The present invention relates to a gutter clearing device. The gutter clearing device provides an adjustable barrier that adjusts between an open and closed position. The adjustable barrier closes to allow the water to flow across the gutter clearing device towards the downspout. A seal located on the gutter clearing reduces the amount of water that leaks at the gutter clearing device.

An attachment base attaches to underside of the gutter. An adhesive seal secures the attachment base to the gutter. The user can then cut a hole or otherwise remove a portion of the gutter located above the base aperture within the seal, such as a gasket. The seal seals around the base aperture to reduce water passing through the attachment of the base to the gutter.

The user opens the adjustable barrier via the adjustment finger. The user pulls down on the adjustment finger to open the barrier to expose the base aperture. The user can then remove the leaves, sticks, and other debris through the base aperture. The user can either manually sweep, push, or pull the leaves, sticks, and other debris through the base aperture. The user may also use a hose, power washer, or blower to direct the leaves, sticks, and other debris through the base aperture.

The user then closes the adjustable barrier to seal the gutter again. The gutter can then function normally without the clogs caused by the leaves, sticks, and other debris.

It is an object of the present invention to provide access to the gutter.

It is another object of the present invention to remove sticks, leaves, and other debris through the gutter via the base aperture.

It is another object of the present invention to simplify the process of cleaning the gutters.

It is another object of the present invention to provide a safer method of cleaning the gutters.

It is another object of the present invention to provide an effective method of cleaning gutters.

It is another object of the present invention to provide a simple attachment for securing the gutter clearing device to the gutter.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a top view thereof;

FIG. 4 is a front view thereof;

FIG. 5 is a bottom view thereof;

FIG. 13 is a front environmental view thereof;

FIG. 13A is a partial view thereof;

FIG. 14 is a front environmental view thereof;

DETAILED DESCRIPTION

Figure 1:
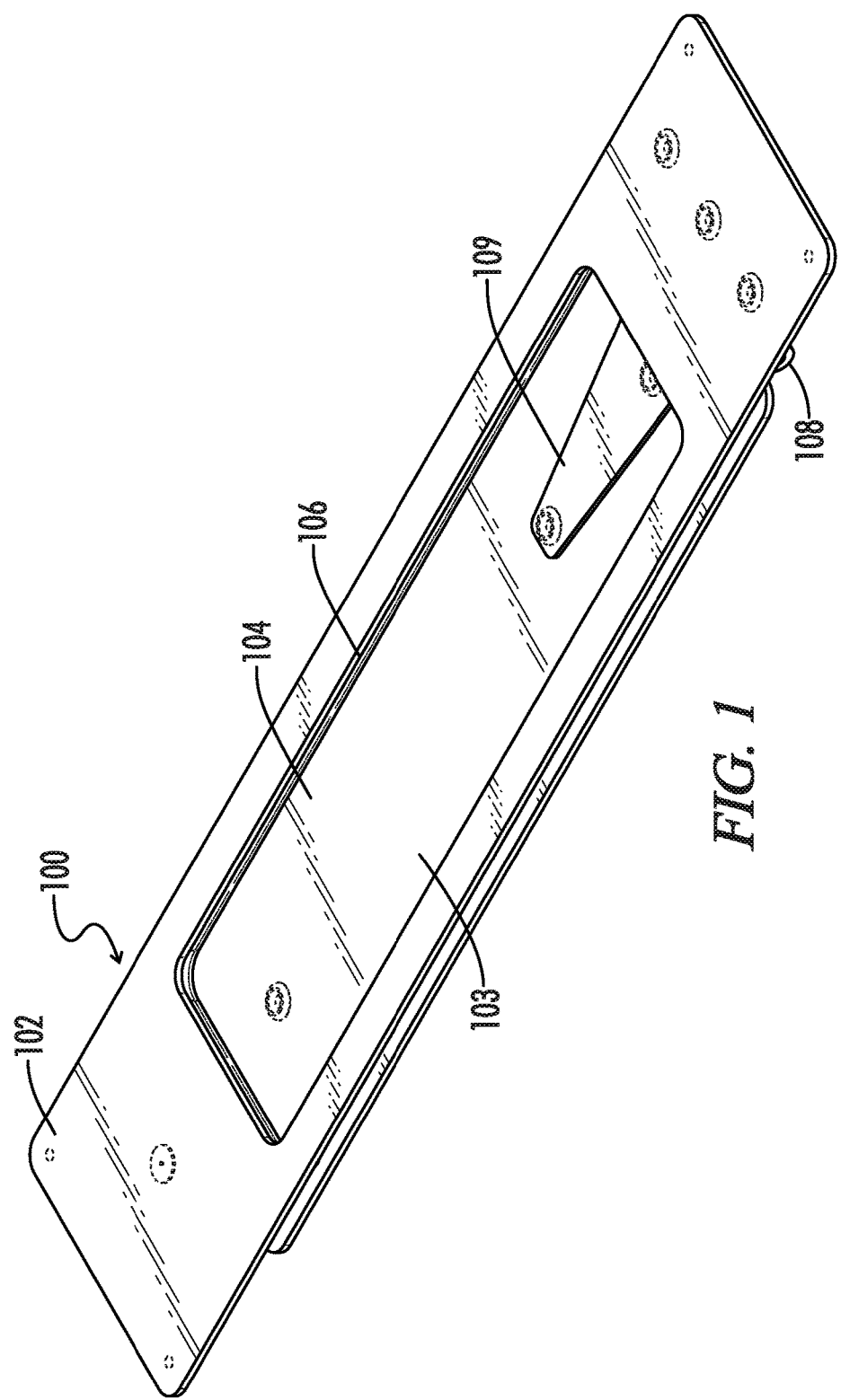
FIG. 1 is a top perspective view showing one embodiment of the present invention.

Referring to FIG. 1, the gutter clearing device 100 secures to the underside of the gutter. The user cuts or otherwise makes an aperture, hole, or other opening in the gutter. The gutter clearing device 100 installs over the gutter aperture. A seal, such as a gasket, located on the attachment base 102, is placed between the gutter and the attachment base to reduce water leaking at the attachment of the gutter clearing device 100 to the gutter.

The gutter clearing device 100 provides an adjustable barrier 104 that adjusts between an open and closed position. The adjustable barrier 104 closes to allow the water to flow across the gutter clearing device 100 towards the downspout. A seal located on the gutter clearing device 100 reduces the amount of water that leaks at the gutter clearing device 100.

The attachment base 102 attaches to underside of the gutter. An adhesive seal, such as a gasket, secures the attachment base 102 to the gutter. The seal is located on the top of the attachment base 102.

The user attaches the top surface of the attachment base 102 to the underside of the gutter. The user can then cut a hole or otherwise remove a portion of the gutter located above the base aperture within the seal, such as a gasket. Alternatively, the user can first create a gutter aperture and then install the base 102 over the gutter aperture. The seal seals around the gutter aperture to reduce water passing through the attachment of the base to the gutter.

Continuing to refer to FIG. 1, the adjustable barrier 104 attaches to pivot finger 109 and pivot 108. The pivot 108 enables adjustment of adjustable barrier 104 between the open and closed position. The barrier 104 adjusted to the open position exposes the gutter aperture to allow the user to remove leaves, sticks, and other debris from the gutter through the gutter aperture and base aperture 103. The barrier 104 adjusted to the closed position, as shown in FIG. 1, closes the gutter aperture and base aperture 103 to direct the water to the downspout.

Figure 2:
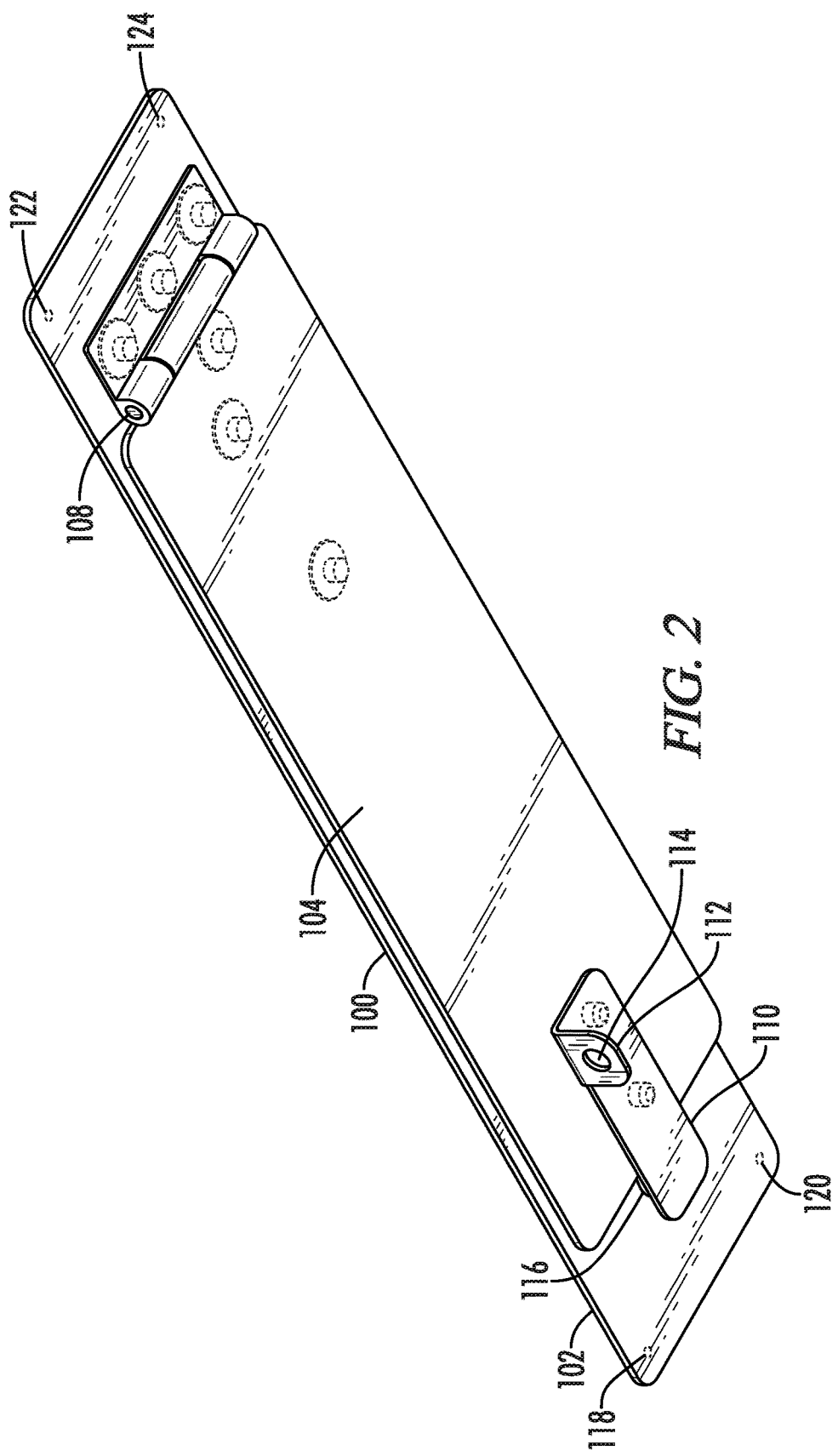
FIG. 2 is a bottom perspective view thereof.
Figure 6:
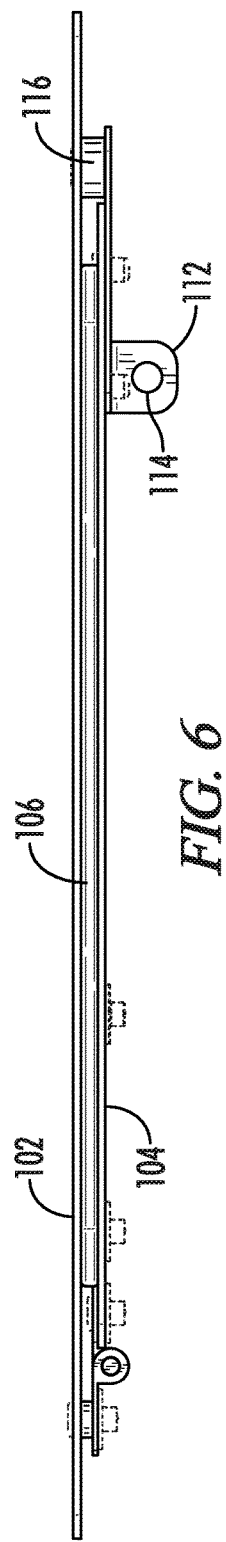
FIG. 6 is a rear view thereof.
Figure 7:
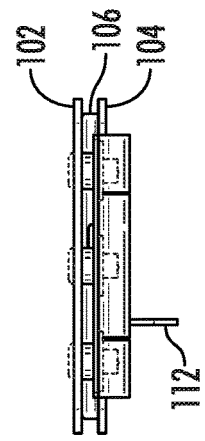
FIG. 7 is a left side view thereof.
Figure 8:
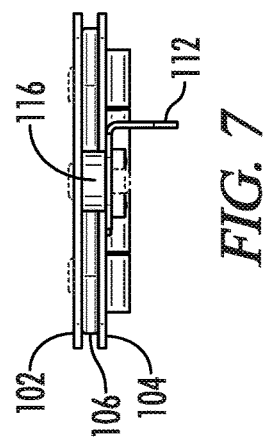
FIG. 8 is a right side view thereof.

FIG. 2 shows one embodiment of the gutter clearing device 100 with the barrier 104 in the closed position against the attachment base 102. Pivot 108 attaches to the attachment base 102 and the barrier 104 for pivoting the barrier 104 between the open and closed position.

Because the gutter is located overhead, the gutter clearing device provides an adjustment finger 112 with adjustment aperture 114. The user may use an adjustment tool to either grab the adjustment finger 112 or insert the tool into the adjustment aperture 114. The user can then pull down on the adjustment tool to open the barrier 104.

The user opens the adjustable barrier 104 via the adjustment finger 112. The user pulls down on the adjustment finger 112 to open the barrier 104 to expose the base aperture 103. The user can then remove the leaves, sticks, and other debris through the base aperture. The user can either manually sweep, push, or pull the leaves, sticks, and other debris through the base aperture. The user may also use a hose, power washer, or blower to direct the leaves, sticks, and other debris through the base aperture.

To maintain the barrier 104 in the closed position, a connector 116, such as a magnet, latch, or other fastener, secures the barrier to the attachment base 102. The connector body 110 connects with connector 116 to secure the barrier 104 in the closed position.

In one embodiment, the gutter clearing device is constructed from aluminum. Because aluminum will not adhere to the magnet, a metal that will adhere to the magnet, such as connector body 110, is attached to the barrier 104.

In one embodiment, the user places an adhesive seal that secures the attachment base 102 to the gutter. In another embodiment, attachment apertures 118, 120, 122, 124 are placed at the corners of the attachment base 102. The user then secures the base 102 to the gutter via fasteners, such as screws, nails, or other fasteners.

The user then closes the adjustable barrier to seal the gutter again. The gutter can then function normally without the clogs caused by the leaves, sticks, and other debris.

FIGS. 3-5 show the relationship between the attachment base 102, base aperture 103, and barrier 104. Adjustment of barrier 104 creates an opening for base aperture 103 for removal of the leaves, sticks, and debris from the gutter.

A seal 106 is located between the attachment base 102 and the barrier 104. The seal 106 encompasses the base aperture 103. The seal 106 is placed on a lower surface, such as the underside, of the attachment base 102. Such placement of the seal 106 places the seal 106 between the attachment base 102 and barrier 104.

Pivot 108 secures the attachment base 102 with the barrier 104. The barrier 104 adjusts between the open position and the closed position. In the closed position, the connector body 110 secures one end of the barrier 104 to the attachment base 102 at connector 116. The user can overcome the connection at connector 116 to release the end of the barrier 104 from the attachment base 102 to open the base aperture 103 and gutter aperture.

Continuing to refer to FIG. 4, the barrier 104 contacts the seal 106 at attachment base 102. The seal 106 reduces the water that can escape through the base aperture 103. The seal 106 assists with directing the water to the downspout.

FIGS. 4-8 show the connector 116 and the connector body 110. The connector 116 magnetically attracts the connector body 110 to maintain the barrier 104 in the closed position. Other embodiments may physically secure the barrier in the closed position via a latch, bolt, or a fastener.

FIGS. 4-8 also show the adjustment finger 112 and adjustment aperture 114. The adjustment finger 112 provides a surface for the user to grasp with a tool or by hand to open the barrier 104. In one embodiment, the adjustment finger 114 extends downward from barrier 104. Such an extension simplifies opening the barrier 104. In one embodiment, the adjustment finger is a separate component secured to the barrier to extend downwards. In another embodiment, the adjustment finger is an extension of the barrier that extends downwards.

One embodiment of the adjustment finger 112 provides the adjustment aperture 114. A tool, such as a pole with a protrusion or a grip, opens and closes the barrier. The user may insert the protrusion into the adjustment aperture 114. The user then pulls downward on the adjustment finger 112. In another embodiment, the user may open the barrier by hand. Usually, the user will prefer to open the barrier with the tool as the gutter is usually out of the user's reach unless the user is on a ladder.

Figure 9:
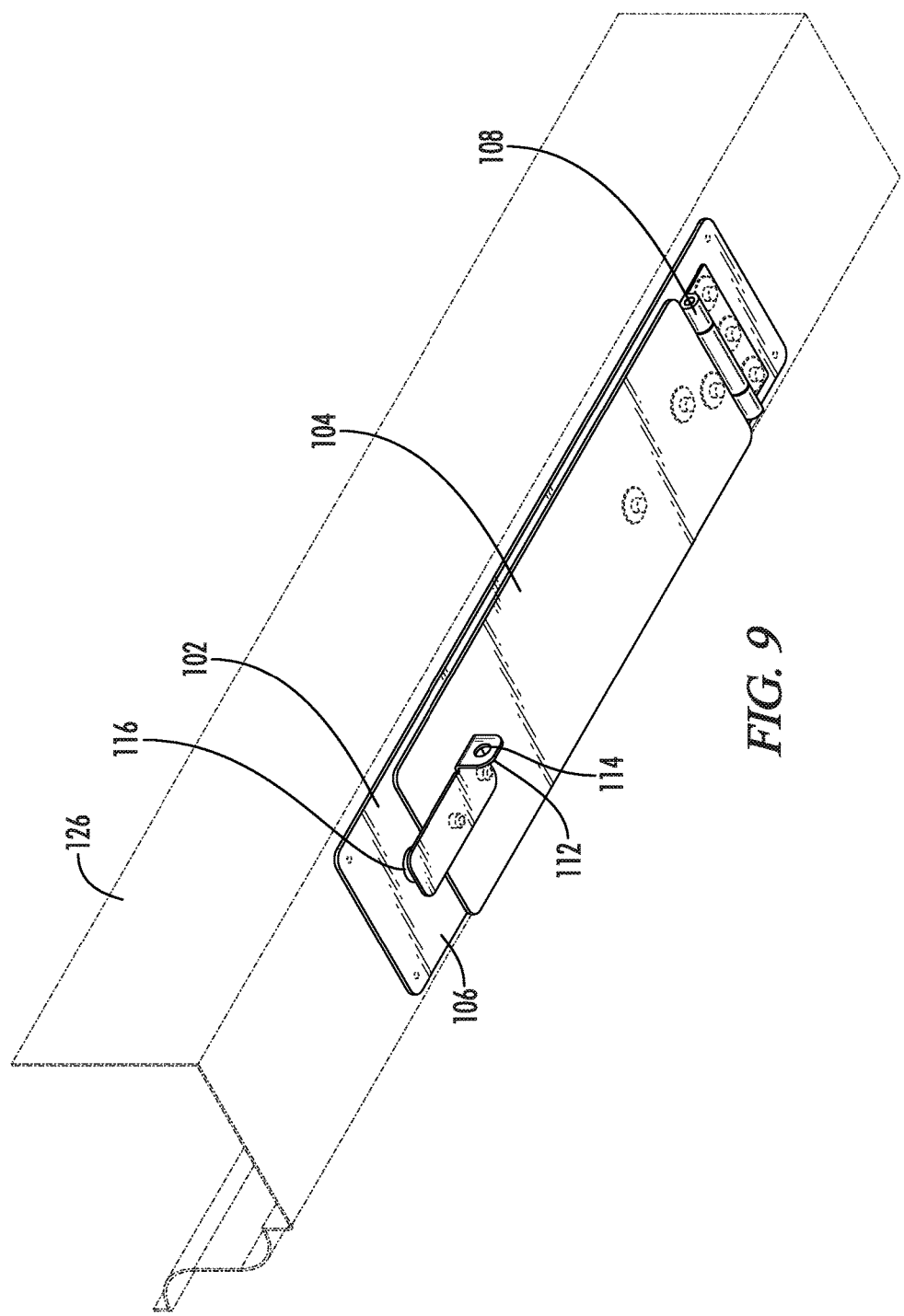
FIG. 9 is an environmental view thereof.
Figure 10:
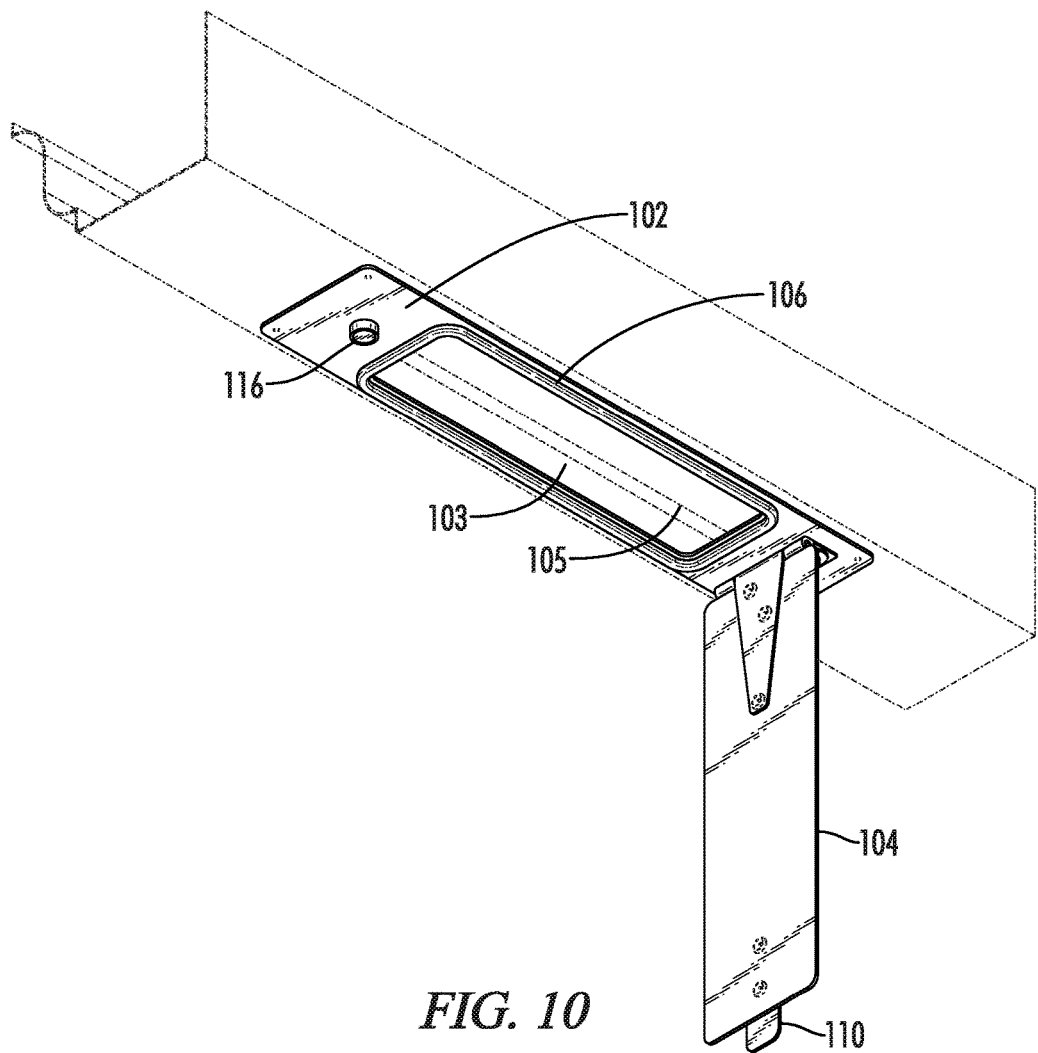
FIG. 10 is an environmental view thereof.
Figure 11:
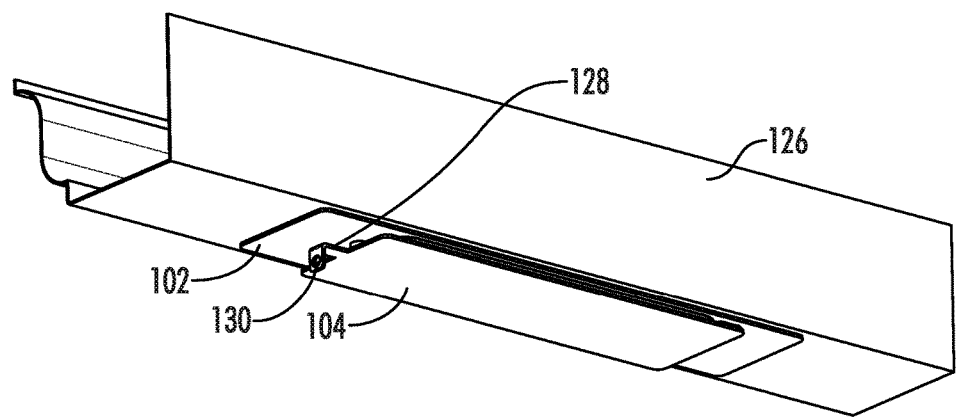
FIG. 11 is a bottom environmental view of one embodiment of the present invention.
Figure 12:
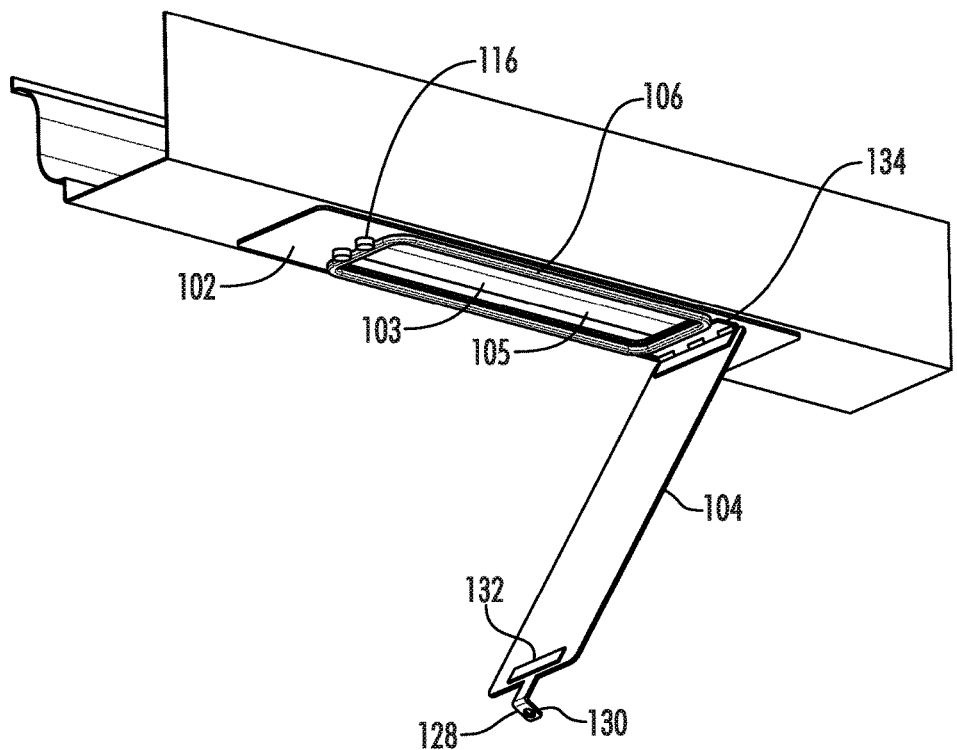
FIG. 12 is a bottom environmental view thereof.

FIGS. 9 and 10 show the gutter clearing device 100 installed on gutter 126. FIG. 9 shows the gutter clearing device 100 in the closed position. FIG. 10 shows the gutter clearing device adjusted to the open position. The upper surface of the attachment base 102 is located adjacent the lower surface of the gutter 126. Pivot 108 secures one end of the barrier 104 to the attachment base 102. Connector 116 secures the other end of the barrier 104 to the attachment base 104. Adjustment finger 112 and adjustment aperture 114 are located closer to the connector 116 than the pivot 108 to assist the user with opening the barrier 104.

FIG. 10 shows the gutter aperture 105 exposed when barrier 104 adjusts to the open position. The user has overcome the connection created by connector 116 and connector body 110. Base aperture 103 provides an opening into the gutter aperture 105 to allow the user to access the contents of the gutter 126.

Seal 106 encompasses the opening created by gutter aperture 105 and base aperture 103. The seal 106 reduces water escaping from the gutter at gutter aperture 105 and base aperture 103.

The user simply closes the barrier 103 by pushing one end of the barrier 104 towards the connector 116. The connector body 110 attracts to the connector 116 to maintain the barrier 104 in the closed position. The magnet allows the user to secure the barrier in the closed position without having to manipulate a latch, bolt, or other fastener.

FIGS. 11-19 show another embodiment of the present invention installed on gutter 126. This embodiment shown in FIGS. 11-19 attaches to the gutter 126 via an adhesive. The gutter clearing device adjusts between a closed position in FIG. 11 to an open position shown in FIG. 12. The attachment base 102 attaches to gutter 126.

The barrier 104 opens and closes against seal 106 to seal the gutter clearing device. The user opens barrier 104 to access the base aperture 103 and gutter aperture. When closed, seal 106 seals the gutter clearing device. The barrier 104 attaches to the attachment base 102. In this embodiment, pivot 134 secures barrier 104 to attachment base 102. The pivot 134 enables the barrier to adjust between the open and closed positions shown in FIGS. 11 and 12.

FIGS. 11-19 also show connector 116, such as a magnet, that secures the barrier 104 in the closed position. Connector body 132 attaches to barrier 104. Connector body 132 provides magnetic qualities that connector 116 attracts. The attraction between connector 116 and connector body 132 maintains the barrier 104 in the closed position against attachment base 102.

The user can overcome the attraction of connector 116 to connector body 132. The user pulls downward on adjustment finger 128 and/or adjustment aperture 130 as discussed above. The user pulling downwards on adjustment finger 128 and/or adjustment aperture 130 pivots one end of barrier 104 downwards to expose base aperture 103.

Figure 15:
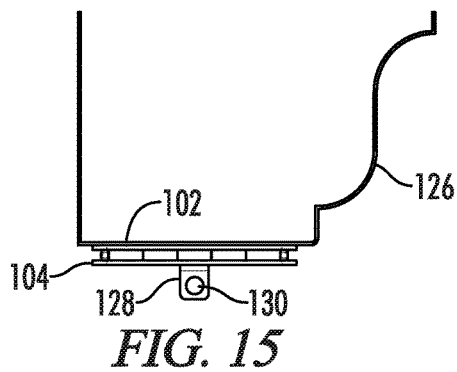
FIG. 15 is an environmental view thereof.
Figure 16:
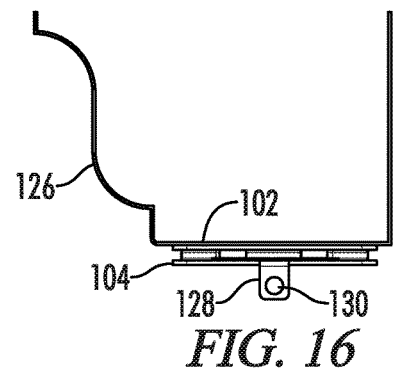
FIG. 16 is an environmental view thereof.
Figure 17:
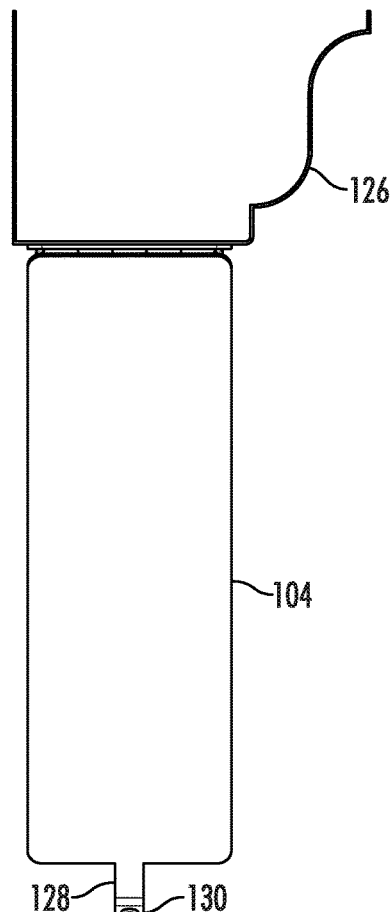
FIG. 17 is an environmental view thereof.
Figure 18:
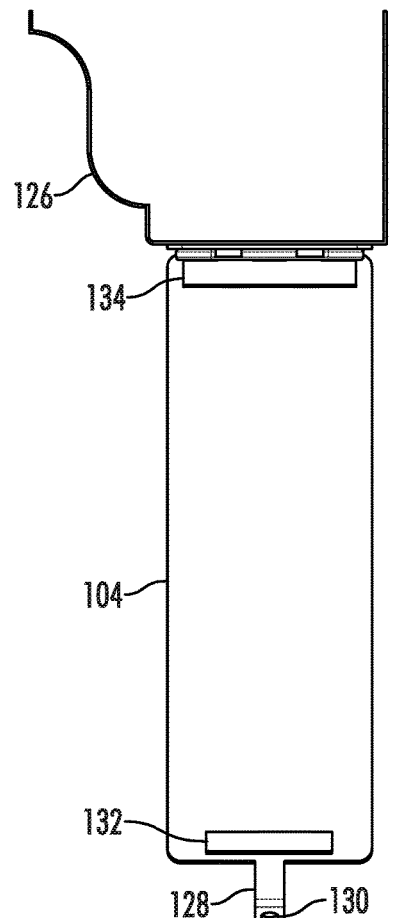
FIG. 18 is an environmental view thereof.

FIGS. 13 and 15-16 show the seal 106 placed between attachment base 102 and barrier 104. The seal 106 maintains a seal between the attachment base 102 and barrier 104 to limit the amount of water that escapes at the gutter clearing device. The seal 106 enables additional water to continue to flow past the gutter clearing device and towards the downspout.

Figure 19:
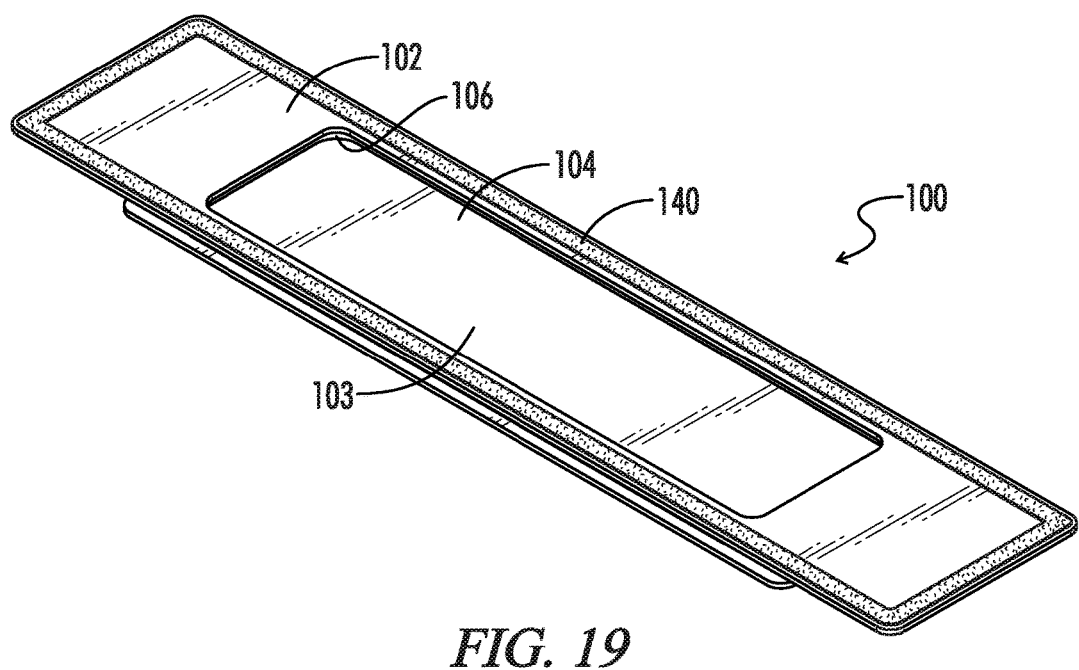
FIG. 19 is a top perspective view of one embodiment of the present invention.

FIG. 19 shows gutter clearing device 100 with the upper seal 140. Upper seal 140 seals the attachment of attachment base 102 with the gutter. The upper seal 140 reduces the amount of water leaking at the gutter clearing device 100. Seal 106 seals at the gutter aperture and the base aperture. Seal 106 limits the water leaking at the barrier 104.

The gutter clearing device is constructed from a rigid material. The gutter clearing device of one embodiment is constructed from a metal, such as aluminum, or plastic. The retention device of one embodiment is constructed from a durable material that can withstand the elements to allow installation outdoors. The present invention may also be constructed from a metal constructed from a metal with sufficient magnetic qualities that a connector body is not required.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A gutter clearing device installed onto a gutter below a gutter aperture that provides access into the gutter for removal of leaves and other debris from the gutter, the device comprising:
    an attachment base that attaches to the gutter across the gutter aperture;
    a base aperture within the attachment base wherein the base aperture at least partially aligns with the gutter aperture;
    an adjustable barrier attached to the attachment base wherein the barrier adjusts between an open position and a closed position to expose the base aperture when the barrier adjusts to the open position.

2. The device of claim 1 further comprising:
    a seal that encompasses the base aperture.

3. The device of claim 2 wherein the seal attaches to a lower surface of the attachment base to place the seal between the attachment base and the barrier when the barrier adjusts to the closed position.

4. The device of claim 1 further comprising:
    a first end of the barrier that pivotally attaches to the attachment base; and
    a second end of the barrier that connects and releases from the attachment base.

5. The device of claim 4 further comprising:
    a connector that connects the second end of the barrier to the attachment base.

6. The device of claim 5 wherein the connector is a magnet.

7. The device of claim 6 further comprising:
    a connector body attached to the barrier wherein the connector magnetically attracts the connector body to the connector to maintain the barrier in the closed position.

8. The device of claim 1 further comprising:
a pivot securing the barrier to the attachment base to enable the barrier to adjust between the open position and the closed position.

9. The device of claim 1 further comprising:
an upper seal located on an upper surface of the attachment base, the upper seal encompassing the base aperture.

10. The device of claim 9 wherein the upper seal encompasses the gutter aperture.

11. A gutter clearing device installed onto a gutter below a gutter aperture that provides access into the gutter for removal of leaves and other debris from the gutter, the device comprising:
an attachment base that attaches to the gutter across the gutter aperture;
a base aperture within the attachment base wherein the base aperture at least partially aligns with the gutter aperture;
an adjustable barrier attached to the attachment base wherein the barrier adjusts between an open position and a closed position;
a pivot attaching the barrier to the attachment base.

12. The device of claim 11 further comprising:
the pivot pivotally attaching a first end of the barrier to the attachment base; and
a second end of the barrier that connects and releases from the attachment base, the pivot enabling the second end of the barrier to pivot in relation to the attachment base.

13. The device of claim 11 further comprising:
a connector that connects the second end of the barrier to the attachment base.

14. The device of claim 13 wherein the connector is a magnet.

15. The device of claim 14 further comprising:
a connector body attached to the barrier wherein the connector magnetically attracts the connector body to the connector to maintain the barrier in the closed position.

16. The device of claim 11 further comprising:
a seal that encompasses the base aperture, the seal attaching to a lower surface of the attachment base to place the seal between the attachment base and the barrier when the barrier adjusts to the closed position.

17. The device of claim 16 further comprising:
an upper seal located on an upper surface of the attachment base, the upper seal encompassing the base aperture.

18. A gutter clearing device installed onto a gutter below a gutter aperture that provides access into the gutter for removal of leaves and other debris from the gutter, the device comprising:
an attachment base that attaches to the gutter across the gutter aperture;
a base aperture within the attachment base wherein the base aperture at least partially aligns with the gutter aperture;
an adjustable barrier attached to the attachment base wherein the barrier adjusts between an open position and a closed position;
a pivot attaching the barrier to the attachment base to pivot from the lower surface of the attachment base;
a seal that encompasses the base aperture, the seal secured to a lower surface of the attachment base to place the seal between the attachment base and the barrier when the barrier adjusts to the closed position.

19. The gutter clearing device of claim 18 further comprising:
an upper seal located on the upper surface of the attachment base wherein the upper seal encompasses the base aperture.

20. The gutter clearing device of claim 19 further comprising:
an adhesive applied to the upper seal wherein the adhesive secures the attachment base to the gutter.

* * * * *